(12) United States Patent
Dètrembleur et al.

(10) Patent No.: US 7,960,446 B2
(45) Date of Patent: Jun. 14, 2011

(54) LOW-VISCOSITY ALLOPHANATES CONTAINING ACTINICALLY CURABLE GROUPS

(75) Inventors: Christophe Dètrembleur, Liège (BE); Jan Weikard, Odenthal (DE); Dorota Greszta-Franz, Erkrath (DE); Frank Richter, Leverkusen (DE); Wolfgang Fischer, Meerbusch (DE); Jörg Schmitz, Köln (DE); Holger Mundstock, Wermelskirchen (DE)

(73) Assignee: Bayer MaterialScience AG, Leverkusen (DE)

( * ) Notice: Subject to any disclaimer, the term of this patent is extended or adjusted under 35 U.S.C. 154(b) by 0 days.

(21) Appl. No.: 12/072,022

(22) Filed: Feb. 22, 2008

(65) Prior Publication Data

US 2008/0214691 A1 Sep. 4, 2008

Related U.S. Application Data

(62) Division of application No. 11/080,706, filed on Mar. 14, 2005, now Pat. No. 7,361,723.

(30) Foreign Application Priority Data

Mar. 17, 2004 (DE) .......................... 10 2004 012 903

(51) Int. Cl.
*C08G 18/16* (2006.01)
*C08G 18/04* (2006.01)
*C08G 18/70* (2006.01)
*C09D 175/16* (2006.01)
*C08F 2/46* (2006.01)

(52) U.S. Cl. ............ 522/90; 522/173; 522/174; 528/48; 528/75; 528/65

(58) Field of Classification Search ............... 528/48, 528/65, 75; 522/90, 173, 174
See application file for complete search history.

(56) References Cited

U.S. PATENT DOCUMENTS

| | | | |
|---|---|---|---|
| 4,108,814 A | 8/1978 | Reiff et al. ............. 260/29.2 TN |
| 4,160,080 A | 7/1979 | Köenig et al. ................... 528/59 |
| 4,542,165 A * | 9/1985 | Kumata et al. ................ 521/137 |
| 4,717,738 A * | 1/1988 | Fukuda et al. ................ 521/137 |
| 4,820,743 A * | 4/1989 | Ishikawa et al. .............. 521/137 |
| 5,672,736 A | 9/1997 | Brahm et al. ................. 560/345 |
| 5,739,251 A | 4/1998 | Venham et al. ................ 528/49 |
| 5,767,220 A * | 6/1998 | Venham et al. ................ 528/49 |
| 5,777,024 A * | 7/1998 | Killilea et al. ................ 524/590 |
| 5,905,151 A * | 5/1999 | Slack et al. .................... 544/222 |
| 5,917,083 A | 6/1999 | König et al. ................... 560/157 |
| 5,951,911 A | 9/1999 | Venham et al. ............. 252/182.2 |
| 6,191,181 B1 * | 2/2001 | Weikard et al. ............... 522/174 |
| 6,392,001 B1 | 5/2002 | Mertes et al. .................. 528/59 |
| 6,458,459 B1 * | 10/2002 | Schwalm et al. .......... 428/423.1 |
| 6,534,128 B1 * | 3/2003 | Carlson et al. ................ 427/466 |
| 6,617,413 B1 * | 9/2003 | Bruchmann et al. ............ 528/75 |
| 6,936,677 B2 * | 8/2005 | Bernard .......................... 528/52 |
| 7,135,505 B2 * | 11/2006 | Roesler et al. .................. 522/96 |
| 7,307,135 B2 * | 12/2007 | Spyrou .......................... 528/48 |
| 2003/0153713 A1 | 8/2003 | Spyrou et al. ................... 528/48 |

FOREIGN PATENT DOCUMENTS

| | | |
|---|---|---|
| CA | 2253119 | 5/1999 |
| GB | 994 890 | 6/1965 |

OTHER PUBLICATIONS

Ludewig, Michael et al, "Allophanate Structures as Building Blocks for Very Low Viscous Urethane Acryaltes". RadTech Europe 2005 Conference & Exhibition., 2005.*
Proceedings of the International Waterborne, High-Solids, and Powder Coating Symposium, 28th, Feb. 21-23, 2001, pp. 405-419, Michaela Gedan-Smolka et al, "New Catalysts for the Low Temperature Curing of Uretdione Powder Coatings".
Proceedings of the International Waterborne, High-Solids, and Powder Coating Symposium, Feb. 21-23, 2001, pp. 77-89, K.B. Chandalia et al, "New Non-Isocyanate Curatives for 2K Solvent-Borne Urethane Coatings".
Chemistry & Technology of UV & EB Formulations for Coating, Inks & Paints, vol. 2, (month unavailable) 1991, pp. 237-285, N.S. Allen et al, Reactive Diluents for UV and EB Curable Formulations.
Patent Abstracts of Japan Bd. 2003, Nr. 06, Jun. 3, 2003 & JP 2003 048927 A (Dainippon Ink & Chem Inc), Feb. 21, 2003.

\* cited by examiner

*Primary Examiner* — Susan W Berman
(74) *Attorney, Agent, or Firm* — Robert S. Klemz; Noland J. Cheung

(57) ABSTRACT

A process for preparing binders containing allophanate groups which contain, at the oxygen atom of the allophanate group that is bonded via two single bonds, organic radicals with activated groups capable of participating in a polymerization reaction with ethylenically unsaturated compounds on exposure to actinic radiation; the process includes reacting A) one or more compounds containing uretdione groups with B) one or more OH-functional compounds which contain groups capable of participating in a polymerization reaction with ethylenically unsaturated compounds on exposure to actinic radiation, and C) optionally further NCO-reactive compounds, and D) in the presence of one or more compounds containing phenoxide groups, as catalysts. The binders can be used in preparing coatings, coating materials, coating compositions, adhesives, printing inks, casting resins, dental compounds, sizes, photoresists, stereolithography systems, resins for composite materials and sealants.

12 Claims, No Drawings

LOW-VISCOSITY ALLOPHANATES CONTAINING ACTINICALLY CURABLE GROUPS

CROSS REFERENCE TO RELATED PATENT APPLICATION

The present application is a divisional application of U.S. application Ser. No. 11/080,706, filed on Mar. 14, 2005 now U.S. Pat. No. 7,361,723.

BACKGROUND OF THE INVENTION

1. Field of the Invention

The present invention relates to low-viscosity reaction products of polyisocyanates which contain activated groups which react, with polymerization, with ethylenically unsaturated compounds on exposure to actinic radiation, to a process for preparing them and to their use in coating compositions.

2. Description of the Prior Art

The curing of coating systems which carry activated double bonds by actinic radiation, such as UV light, IR radiation or else electron beams, is known and is established in industry. It is one of the most rapid curing methods in coating technology.

Because of the environmental and economic requirements imposed on modern coating systems, that they should use as little organic solvents as possible, or none at all, for adjusting the viscosity, there is a desire to use coatings raw materials which are already of low viscosity. Known for this purpose for a long time have been polyisocyanates with an allophanate structure as are described, inter alia, in EP-A 0 682 012.

In industry these substances are prepared by reacting a monohydric or polyhydric alcohol with excess aliphatic and/or cycloaliphatic diisocyanate (cf. GB-A 994 890, EP-A 0 000 194 or EP-A 0 712 840). This is followed by removal of unreacted diisocyanate by means of distillation under reduced pressure. According to DE-A 198 60 041 this procedure can also be carried out with OH-functional compounds having activated double bonds, such as hydroxyalkyl acrylates, although difficulties occur in relation to the preparation of particularly low-monomer products. Since the distillation step has to take place at temperatures up to 135° C., in order to be able to lower the residue isocyanate content sufficiently (<0.5% by weight of residue monomer), it is possible for double bonds to react, with polymerization, under thermal initiation, even during the purification process, meaning that ideal products are no longer obtained.

The preparation of low-monomer-content, allophanate-containing, polyurethane-based, radiation-curing binders is described in EP-A 0 867 457 and U.S. Pat. No. 5,739,251. These binders, however, do not carry activated double bonds but instead carry unreactive allyl ether groups (structure R—O—CH$_2$—CH=CH$_2$). It is therefore necessary to add reactive diluents (low molecular weight esters of acrylic acid), which introduce the required UV reactivity.

EP-A 0 825 211 describes a process for synthesizing allophanate structures from oxadiazinetriones, although no radiation-curing derivatives having activated double bonds are known. All that is mentioned is the use of maleate- and/or fumarate-containing polyesters; the possibility of radiation curing is not described.

U.S. Pat. No. 5,777,024 describes the preparation of low-viscosity radiation-curing allophanates by reacting hydroxy-functional monomers which carry activated double bonds with isocyanate groups of allophanate-modified isocyanurate polyisocyanates. The allophanate-bound radicals are saturated as a result.

The formation of allophanate compounds by ring opening of uretdiones with alcohols is known in principle as a crosslinking mechanism in powder coating materials (cf. Proceedings of the International Waterborne, High-Solids, and Powder Coatings Symposium 2001, 28th, 405-419, and also US-A 2003 0153 713). Nevertheless, the reaction temperatures required for this purpose are too high (≧120° C.) for a targeted preparation of radiation-curing monomers based on allophanate with activated double bonds.

Historically the direct reaction of uretdione rings with alcohols to allophanates was first investigated for solvent-borne, isocyanate-free, 2K [2-component] polyurethane coating materials. Without catalysis this reaction is of no technical importance, owing to the low reaction rate (F. Schmitt, Angew. Makromol. Chem. (1989), 171, pp. 21-38). With appropriate catalysts, however, the crosslinking reaction between HDI-based uretdione curatives and polyols is said to begin at 60-80° C. (K. B. Chandalia; R. A Englebach; S. L. Goldstein; R. W. Good; S. H. Harris; M. J. Morgan; P. J. Whitman; R. T. Wojcik, Proceedings of the International Waterborne, High-Solids, and Powder Coatings Symposium, (2001), pp. 77-89). The structure of these catalysts has not been published to date. Commercial products prepared by utilizing this reaction are also undisclosed to date.

In summary it may be stated that the preparation of low-viscosity radiation-curing allophanates by ring-opening reaction of alcohols carrying activated double bonds with uretdiones at temperatures below 100° C. is not disclosed in detail in the prior art.

SUMMARY OF THE INVENTION

The present invention provides a process for preparing binders containing allophanate groups which contain, at the oxygen atom of the allophanate group that is bonded via two single bonds, organic radicals with activated groups capable of participating in a polymerization reaction with ethylenically unsaturated compounds on exposure to actinic radiation; the process includes reacting A) one or more compounds containing uretdione groups with B) one or more OH-functional compounds which contain groups capable of participating in a polymerization reaction with ethylenically unsaturated compounds on exposure to actinic radiation, and C) optionally further NCO-reactive compounds, and D) in the presence of one or more compounds containing phenoxide groups, as catalysts.

The present invention also provides a method of preparing coatings, coating materials, adhesives, printing inks, casting resins, dental compounds, sizes, photoresists, stereolithography systems, resins for composite materials and sealants. The method includes combining the above-described binders containing allophanate groups and one or more additives selected from the group consisting of UV absorbers, HALS stabilizers, pigments, dyes, fillers, levelling additives, devolatilizing additives, catalysts, and combinations thereof.

The present invention additionally provides coating compositions that include a) one or more of the above-described binders containing allophanate groups, b) optionally one or more polyisocyanates containing free or blocked isocyanate groups, which are free from groups capable of participating in a polymerization reaction with ethylenically unsaturated compounds on exposure to actinic radiation, c) optionally other compounds, different from those of a), which contain groups capable of participating in a polymerization reaction with ethylenically unsaturated compounds on exposure to actinic radiation, and optionally contain free or blocked NCO groups, d) optionally one or more isocyanate-reactive compounds containing active hydrogen, e) initiators, f) optionally solvents and g) optionally auxiliaries and additives.

The present invention further provides substrates coated with coatings obtained from the above-described binders containing allophanate groups.

DETAILED DESCRIPTION OF THE INVENTION

Other than in the operating examples, or where otherwise indicated, all numbers or expressions referring to quantities of ingredients, reaction conditions, etc. used in the specification and claims are to be understood as modified in all instances by the term "about."

It was an object of the present invention to provide a process for preparing binders containing allophanate groups and having activated double bond(s) which is accomplished with temperatures of below 100° C., the products thus obtainable preferably having viscosities at 23° C., in undiluted form, of ≦100.000 mPas.

Surprisingly it has now been found that from the reaction of uretdiones with alcohols containing activated double bonds the desired binders can be obtained using phenoxide salts as catalysts.

The invention accordingly provides a process for preparing binders containing allophanate groups which contain, at the oxygen atom of the allophanate group that is bonded via two single bonds, organic radicals with activated groups which react, with polymerization, with ethylenically unsaturated compounds on exposure to actinic radiation, where
one or more compounds containing uretdione groups is or are reacted with one or more OH-functional compounds which contain groups which react, with polymerization, with ethylenically unsaturated compounds on exposure to actinic radiation, and
optionally further NCO-reactive compounds
in the presence of one or more compounds containing phenoxide groups, as catalysts, and optionally auxiliaries and additives.

Additionally the binders obtainable by the process of the invention are provided by the invention.

In component A) it is possible to use all organic compounds which contain at least one uretdione group.

Preferably these are compounds obtainable by catalytic dimerization of aliphatic, cycloaliphatic and/or araliphatic diisocyanates or polyisocyanates by methods which are known per se (cf. J. Prakt. Chem. 1994, 336, page 196-198).

Examples of suitable diisocyanates include 1,4-diisocyanatobutane, 1,6-diisocyanatohexane (HDI), trimethylhexane diisocyanate, 1,3- and 1,4-bisisocyanatomethylcyclohexane, isophorone diisocyanate (IPDI), 4,4-diisocyanatodicyclohexylmethanes, 1,3- and 1,4-xylylene diisocyanates (XDI commercial product from Takeda, Japan), diphenylmethane 4,4'-diisocyanate and diphenylmethane 2,4'-diisocyanate (MDI), 2,4- and 2,6-toluene diisocyanate (TDI), or mixtures thereof. 1,6-Diisocyanatohexane is preferred.

Examples of catalysts employed in this context include the following: trialkylphosphines, dimethylaminopyridines, tris(dimethylamino)phosphine.

The result of the dimerization reaction depends, in a manner known to the skilled person, on the catalyst used, on the process conditions and on the diisocyanates employed. In particular it is possible for products to be formed which contain on average more than one uretdione group per molecule, the number of uretdione groups being subject to a distribution. Depending on the catalyst used, the process conditions and the diisocyanates employed, product mixtures are also formed which in addition to uretdiones also contain other structural units, such as isocyanurate and/or iminooxadiazinedione, for example.

Particularly preferred compounds of component A) comprise products of the catalytic dimerization of HDI, have a free HDI content of less than 0.5% by weight, an NCO content of 17-25% by weight, in particular of 21-24% by weight, and a viscosity at 23° C. of from 20 to 500 mPas, preferably from 50 to 200 mPas.

The generally NCO-functional compounds obtainable by catalytic dimerization are preferably used directly as part of component A), but in principle they can also first be subjected to further reaction and only then used in A). This further reaction may be, for example, blocking of the free NCO groups or further reaction of NCO groups with NCO-reactive compounds having a functionality of 2 or more to form iminooxadiazinedione, isocyanurate, urethane, allophanate, biuret urea, oxadiazinetrione, oxazolidinone, acylurea or carbodiimide structures. This gives compounds containing uretdione groups and of higher molecular weight, which, depending on the chosen proportions, may contain NCO groups or may be free from NCO groups.

Blocking agents suitable for example are alcohols, lactams, oximes, malonates, alkyl acetoacetates, triazoles, phenols, imidazoles, pyrazoles and amines, such as butanone oxime, diisopropylamine, 1,2,4-triazole, dimethyl-1,2,4-triazole, imidazole, diethyl malonate, ethyl acetoacetate, acetone oxime, 3,5-dimethylpyrazole, ε-caprolactam, N-tert-butyl-benzylamine, cyclopentanone carboxyethyl ester or any desired mixtures of these blocking agents. The procedure for the blocking of NCO groups is well known to the skilled worker and described exemplarily in Progress in Organic Coatings 1999, 36, 148-172.

NCO-reactive compounds with a functionality of two or more can be the abovementioned di- and/or polyisocyanates, and also simple alcohols with a functionality of two or more, such as ethylene glycol, propane-1,2-diol, propane-1,3-diol, diethylene glycol, dipropylene glycol, the isomeric butanediols, neopentyl glycol, hexane-1,6-diol, 2-ethylhexanediol and tripropylene glycol or else alkoxylated derivatives of these alcohols. Preferred dihydric alcohols are hexane-1,6-diol, dipropylene glycol and tripropylene glycol. Suitable trihydric alcohols are glycerol or trimethylolpropane or their alkoxylated derivatives. Tetrahydric alcohols are pentaerythritol or its alkoxylated derivatives.

The compounds of component A) can be used directly in the process of the invention or, starting from any precursor, can be prepared by prior reaction before the process of the invention is carried out.

By actinic radiation is meant electromagnetic, ionizing radiation, especially electron beams, UV radiation and also visible light (Roche Lexikon Medizin, 4th edition; Urban & Fischer Verlag, Munich 1999).

Groups which react, with polymerization, with ethylenically unsaturated compounds on exposure to actinic radiation are for example vinyl, vinyl ether, propenyl, allyl, maleyl, fumaryl, maleimide, dicyclopentadienyl, acrylamide, acrylic and methacrylic groups, preference being given to using activated groups of this kind such as vinyl ether, acrylate and/or methacrylate groups, more preferably acrylate groups, in the compounds of component B).

Examples of suitable hydroxyl-containing compounds of component B) are 2-hydroxyethyl(meth)acrylate, polyethylene oxide mono(meth)acrylate (e.g. PEA6/PEM6; Laporte Performance Chemicals Ltd., UK), polypropylene oxide mono(meth)acrylate (e.g. PPA6, PPM5S; Laporte Performance Chemicals Ltd., UK), polyalkylene oxide mono(meth)acrylate (e.g. PEM63P, Laporte Performance Chemicals Ltd., UK), poly(ε-caprolactone) mono(meth)acrylates (e.g. Tone M100® Dow, Schwalbach, Del.), 2-hydroxypropyl(meth)acrylate, 4-hydroxybutyl(meth)acrylate, hydroxybutyl vinyl ether, 3-hydroxy-2,2-dimethylpropyl(meth)acrylate, the hydroxy-functional mono-, di- or where possible higher acrylates such as, for example, glyceryl di(meth)acrylate, trimethylolpropane di(meth)acrylate, pentaerythritol tri(meth)acrylate or dipentaerythritol penta(meth)acrylate, which are obtainable by reacting polyhydric, optionally alkoxylated alcohols such as trimethylolpropane, glycerol, pentaerythritol, dipentaerythritol.

Likewise suitable as a constituent of B) as well are alcohols obtained from the reaction of acids containing double bonds with epoxide compounds optionally containing double bonds, such as, for example, the reaction products of (meth)acrylic acid with glycidyl (meth)acrylate or bisphenol A diglycidyl ether.

Additionally it is likewise possible to use unsaturated alcohols which are obtained from the reaction of optionally unsaturated acid anhydrides with hydroxy compounds and epoxide compounds that optionally contain acrylate groups. By way of example these are the reaction products of maleic anhydride with 2-hydroxyethyl(meth)acrylate and glycidyl(meth)acrylate.

With particular preference the compounds of component B) correspond to the aforementioned kind and have an OH functionality of from 0.9 to 1.1.

Particular preference is given to compounds containing primary hydroxyl groups, since in the process of the invention they are more reactive than secondary or tertiary hydroxyl groups. Very particular preference is given to 2-hydroxyethyl acrylate and 4-hydroxybutyl acrylate.

Besides the OH-functional unsaturated compounds of component B) it is possible in the process of the invention to use further compounds C) as well, which are different from those of B) and contain NCO-reactive groups such as OH, SH or NH, for example. These may be, for example, NH- or SH-functional compounds containing groups which react, with polymerization, with ethylenically unsaturated compounds on exposure to actinic radiation.

Additionally it is possible to incorporate groups having a hydrophilicizing action, particularly if use from an aqueous medium is envisaged, such as in an aqueous coating material, for example. Groups with a hydrophilicizing action are ionic groups, which may be either cationic or anionic in nature, and/or nonionic hydrophilic groups. Cationically, anionically or nonionically dispersing compounds are those which contain, for example, sulphonium, ammonium, phosphonium, carboxylate, sulphonate or phosphonate groups or the groups which can be converted into the aforementioned groups by forming salts (potentially ionic groups) or which contain polyether groups and can be incorporated by means of existing isocyanate-reactive groups. Isocyanate-reactive groups of preferred suitability are hydroxyl and amino groups.

Examples of suitable ionic compounds or compounds containing potentially ionic groups are mono- and dihydroxycarboxylic acids, mono- and diaminocarboxylic acids, mono- and dihydroxysulphonic acids, mono- and diaminosulphonic acids and also mono- and dihydroxyphosphonic acids or mono- and diaminophosphonic acids and their salts, such as dimethylol propionic acid, dimethyl-olbutyric acid, hydroxypivalic acid, N-(2-aminoethyl)-β-alanine, 2-(2-aminoethylamino)ethanesulphonic acid, ethylenediamine-propyl- or butylsulphonic acid, 1,2- or 1,3-propylenediamine-β-ethylsulphonic acid, malic acid, citric acid, glycolic acid, lactic acid, glycine, alanine, taurine, lysine, 3,5-diaminobenzoic acid, an adduct of IPDI and acrylic acid (EP-A 0 916 647, Example 1) and its alkali metal and/or ammonium salts; the adduct of sodium bisulphite with but-2-ene-1,4-diol, polyethersulphonate, the propoxylated adduct of 2-butenediol and NaHSO$_3$, described for example in DE-A 2 446 440 (page 5-9, formula I-III) and also structural units which can be converted into cationic groups, such as N-methyldiethanolamine, as hydrophilic synthesis components. Preferred ionic or potential ionic compounds are those possessing carboxyl or carboxylate and/or sulphonate groups and/or ammonium groups. Particularly preferred ionic compounds are those which contain carboxyl and/or sulphonate groups as ionic or potentially ionic groups, such as the salts of N-(2-aminoethyl)-β-alanine, of 2-(2-aminoethylamino)ethanesulphonic acid or of the adduct of IPDI and acrylic acid (EP-A-0 916 647, Example 1) and also of dimethylolpropionic acid. Suitable nonionically hydrophilicizing compounds are, for example, polyoxyalkylene ethers containing at least one hydroxyl or amino group. These polyethers include a fraction of from 30% to 100% by weight of units derived from ethylene oxide. Suitable compounds include polyethers of linear construction with a functionality of between 1 and 3, but also compounds of the general formula (I),

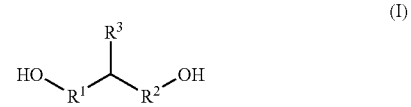

in which
$R^1$ and $R^2$ independently of one another are each a divalent aliphatic, cycloaliphatic or aromatic radical having 1 to 18 carbon atoms, which may be interrupted by oxygen and/or nitrogen atoms, and
$R^3$ is an alkoxy-terminated polyethylene oxide radical.

Nonionically hydrophilicizing compounds are, for example, also monohydric polyalkylene oxide polyether alcohols containing on average 5 to 70, preferably 7 to 55, ethylene oxide units per molecule, such as are obtainable in conventional manner by alkoxylating suitable starter molecules (e.g. in Ullmanns Encyclopädie der technischen Chemie, 4th edition, volume 19, Verlag Chemie, Weinheim pp. 31-38).

Examples of suitable starter molecules are saturated monoalcohols such as methanol, ethanol, n-propanol, isopropanol, n-butanol, isobutanol, sec-butanol, the isomers pentanols, hexanols, octanols and nonanols, n-decanol, n-dodecanol, n-tetradecanol, n-hexadecanol, n-octadecanol, cyclohexanol, the isomeric methylcyclohexanols or hydroxymethylcyclohexane, 3-ethyl-3-hydroxymethyloxetane or tetrahydrofurfuryl alcohol, diethylene glycol monoalkyl ethers such as, for example, diethylene glycol monobutyl ether, unsaturated alcohols such as allyl alcohol, 1,1-dimethylallyl alcohol or oleyl alcohol, aromatic alcohols such as phenol, the isomeric cresols or methoxyphenols, araliphatic alcohols such as benzyl alcohol, anisyl alcohol or cinnamyl alcohol, secondary monoamines such as dimethylamine, diethylamine, dipropylamine, diisopropylamine, dibutylamine, bis(2-ethylhexyl)amine, N-methyl- and N-ethylcyclohexylamine or dicyclohexylamine and also heterocyclic secondary amines such as morpholine, pyrrolidine, piperidine or 1H-pyrazole. Preferred starter molecules are saturated monoalcohols. Particular preference is given to using diethylene glycol monobutyl ether as starter molecule.

Alkylene oxides suitable for the alkoxylation reaction are, in particular, ethylene oxide and propylene oxide, which can be used in any order or in a mixture in the alkoxylation reaction.

The polyalkylene oxide polyether alcohols are either straight polyethylene oxide polyethers or mixed polyalkylene oxide polyethers at least 30 mol %, preferably at least 40 mol %, of whose alkylene oxide units are composed of ethylene oxide units. Preferred nonionic compounds are monofunctional mixed polyalkylene oxide polyethers which contain at least 40 mol % of ethylene oxide units and not more than 60 mol % of propylene oxide units.

Especially when using a hydrophilicizing agent containing ionic groups it is necessary to investigate its effect on the action of the catalyst D). For this reason preference is given to nonionic hydrophilicizing agents.

As compounds of catalyst component D) it is also possible, in addition to the phenoxides for use in accordance with the invention, to make use in principle of the compounds known per se to the skilled person for catalysing the reaction of isocyanate groups with isocyanate-reactive groups, individually or in any desired mixtures with one another.

Examples that may be mentioned here include tertiary amines such as triethylamine, pyridine, methylpyridine, benzyldimethylamine, N,N-endoethylenepiperazine, N-methylpiperidine, pentamethyldiethylenetriamine, N,N-dimethylaminocyclohexane, N,N'-dimethylpiperazine, 1,4-diazabicyclo[2.2.2]octane (DABCO) or metal salts such as iron(III) chloride, tin(II) octoate, tin(II) ethylcaproate, tin(II) palmitate, dibutyltin(IV) dilaurate, dibutyltin(IV) diacetate and molybdenum glycolate or any desired mixtures of such catalysts.

It is preferred, however, in D) to use exclusively phenoxides and/or compounds containing phenoxide groups as catalysts.

The compounds of component D) containing phenoxide groups preferably correspond to the general formula (II),

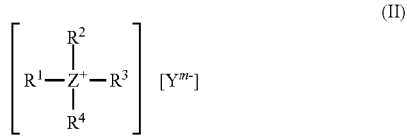

(II)

in which
Z is nitrogen or phosphorus,
$R^1, R^2, R^3, R^4$ independently of one another are hydrogen or identical or different optionally unsaturated, substituent-bearing or heteroatom-containing aliphatic, cycloaliphatic or aromatic radicals having up to 24 carbon atoms and
Y is a phenoxide radical of the general formula (III),

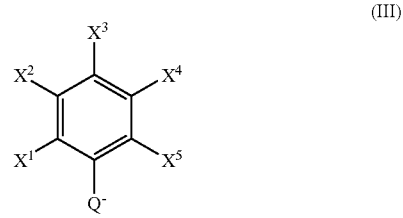

(III)

in which
Q is oxygen,
$X^1, X^2, X^3, X^4, X^5$ independently of one another are substituents selected from the group consisting of hydrogen, halogen, cyano, hydroxyl, amide, amine, ether, ester, thioether, ketone, aldehyde and carboxylate group and also optionally unsaturated, substituent-bearing or heteroatom-containing aliphatic, cycloaliphatic or aromatic radicals having up to 24 carbon atoms, and optionally form parts of cyclic or polycyclic systems.

As compounds of formula (II) containing phenoxide groups it is particularly preferred to use ammonium phenoxides and phosphonium phenoxides and especially preferred to use tetraalkylammonium phenoxides and tetraalkylphosphonium phenoxides.

Phenoxides preferred in particular are tetrabutylammonium 4-(methoxycarbonyl)phenoxide, tetrabutylammonium 2-(methoxycarbonyl)phenoxide, tetrabutylammonium 4-formylphenoxide, tetrabutylammonium 4-nitrilephenoxide, tetrabutylphosphonium 4-(methoxycarbonyl)phenoxide, tetrabutylphosphonium 2-(methoxycarbonyl)phenoxide, tetrabutylphosphonium 4-formylphenoxide, tetrabutylammonium salicylate and/or tetrabutylphosphonium salicylate.

It is also possible to generate the aforementioned phenoxides of component D) in situ during the process. By using the corresponding phenols and strong bases such as tetrabutylammonium hydroxide or tetrabutylphosphonium hydroxide it is possible to generate the catalytically active phenoxides actually during the process.

It may be pointed out at this point that phenolic stabilizers of component E) may also react, by reaction with bases, to form phenoxides which function as catalysts for the purposes of component D). In that case it should be ensured that such phenoxides, in contrast to the corresponding phenols, no longer possess any stabilizing effect. It should also be borne in mind that strong bases such as tetrabutylammonium hydroxide or tetrabutylphosphonium hydroxide catalyse the formation of other isocyanate derivatives, especially the trimerization.

It is also possible to apply the catalysts D) to support materials by methods known to the skilled person and to use them as heterogeneous catalysts.

The compounds of the catalyst component D) can be dissolved advantageously in one of the components participating in the process, or in a portion thereof. In particular the phenoxide salts for use in accordance with the invention dissolve very well in the polar hydroxyalkyl acrylates, so that D) in solution in small amounts of B) can be metered in as a concentrated solution in liquid form.

In the process of the invention the catalyst component D) is used typically in amounts of 0.001-5.0% by weight, preferably 0.01-2.0% by weight and more preferably 0.05-1.0% by weight, based on solids content of the process product.

As constituents of component E) it is possible in the process of the invention to make use, for example, of solvents or reactive diluents as well.

Suitable solvents are inert towards the functional groups present in the process product from the time of their addition up to the end of the process. Suitable solvents are, for example, those used in the paint industry, such as hydrocarbons, ketones and esters, e.g. toluene, xylene, isooctane, acetone, butanone, methyl isobutyl ketone, ethyl acetate, butyl acetate, tetrahydrofuran, N-methylpyrrolidone, dimethylacetamide and dimethylformamide, though it is preferred not to add any solvent.

As reactive diluents it is possible to use compounds which in the course of UV curing are likewise (co)polymerized and hence incorporated into the polymer network and inert towards NCO groups. Such reactive diluents are described exemplarily, by way of example, in P. K. T. Oldring (Ed.), Chemistry & Technology of UV & EB Formulations For Coatings, Inks & Paints, Vol. 2, 1991, SITA Technology, London, pp. 237-285. They may be esters of acrylic acid or methacrylic acid, preferably of acrylic acid, with mono- or polyfunctional alcohols. Examples of suitable alcohols include the isomeric butanols, pentanols, hexanols, heptanols, octanols, nonanols and decanols, and also cycloaliphatic alcohols such as isobornol, cyclohexanol and alkylated cyclohexanols, dicyclopentanol, arylaliphatic alcohols such as phenoxyethanol and nonylphenylethanol, and tetrahydrofurfuryl alcohols. Additionally it is possible to use alkoxylated derivatives of these alcohols. Suitable dihydric alcohols are, for example, alcohols such as ethylene glycol, propane-1,2-diol, propane-1,3-diol, diethylene glycol, dipropylene glycol, the isomeric butanediols, neopentyl glycol, hexane-1,6-diol, 2-ethylhexanediol and tripropylene glycol or else alkoxylated derivatives of these alcohols. Preferred dihydric alcohols are hexane-1,6-diol, dipropylene glycol and tripropylene glycol. Suitable trihydric alcohols are glycerol or trimethylolpropane or their alkoxylated derivatives. Tetrahydric alcohols are pentaerythritol or its alkoxylated derivatives.

The binders of the invention must be stabilized against premature polymerization. Therefore, as a constituent of component E), before and/or during the reaction of components A) to D), preferably phenolic stabilizers are added which inhibit the polymerization. Use is made in this context of phenols such as para-methoxyphenyl, 2,5-di-tert-butylhydroquinone or 2,6-di-tert-butyl-4-methylphenol. Also suitable are N-oxyl compounds for stabilization, such as 2,2,6,6-tetramethylpiperidine N-oxide (TEMPO), for example, or its derivatives. The stabilizers can also be incorporated chemically into the binder; suitability in this context is possessed by compounds of the abovementioned classes, especially if they still carry further free aliphatic alcohol groups or primary or secondary amine groups and hence can be attached chemically to compounds of component A) by way of urethane or urea groups. Particularly suitable for this purpose are 2,2,6,6-tetramethyl-4-hydroxypiperidine N-oxide. Preference is given to phenolic stabilizers, especially para-methoxyphenol and/or 2,6-di-tert-butyl-4-methylphenol.

Other stabilizers, such as compounds from the class of the HALS (HALS=hindered amine light stabilizers), in contrast, are used less preferably in E), since they are known not to enable such effective stabilization and instead may lead to "creeping" free-radical polymerization of unsaturated groups.

In order to stabilize the reaction mixture, in particular the unsaturated groups, against premature polymerization it is possible to pass an oxygen-containing gas, preferably air, into and/or over the reaction mixture. It is preferred for the gas to have a very low moisture content, in order to prevent unwanted reaction in the presence of free isocyanate groups.

In general a stabilizer is added during the preparation of the binders of the invention, and at the end, in order to achieve a long-term stability, stabilization is repeated with a phenolic stabilizer, and optionally the reaction product is saturated with air.

In the process of the invention the stabilizer component is used typically in amounts of 0.001-5.0% by weight, preferably 0.01-2.0% by weight and more preferably 0.05-1.0% by weight, based on the solids content of the process product.

The ratio of OH groups from component B) to the sum of NCO and uretdione groups from A) is typically from 1.5:1.0 to 1.0:1.9, preferably from 1.0:1.0 to 1.0:1.9, more preferably from 1.0:1.0 to 1.0:1.2.

The process of the invention is preferably carried out at temperatures of 20 to 100° C., more preferably of 40 to 100° C., in particular of 80 to 89° C.

Normally the NCO groups that may be present react more rapidly with the hydroxyl groups of component B) than do the uretdione groups of component A). It is therefore possible, if two or more different constituents are present in B), to control the urethanization and allophanatization by means of the sequence of addition of the constituents accordingly in such a way that one constituent of B) is incorporated preferably with urethanization while the constituent added last is incorporated preferably with allophanatization.

It is, however, also possible to end the allophanatization by adding catalyst-deactivating compounds (in the case of the phenoxides, for example, strong acids such as acidic phosphoric esters) or adding further isocyanate-containing compounds which scavenge the remaining compounds of components B) and C).

It is immaterial whether the process of the invention is carried out continuously in for example a static mixer, extruder or compounder or batchwise in for example a stirred reactor.

Preferably the process of the invention is carried out in a stirred reactor, the sequence of addition of components A)-E) being arbitrary.

The course of the reaction can be monitored by means of suitable measuring instruments installed in the reaction vessel and/or on the basis of analyses on samples taken. Suitable techniques are known to the skilled person. They include, for example, viscosity measurements, measurements of the refractive index, of the OH content, gas chromatography (GC), nuclear magnetic resonance spectroscopy (NMR), infrared spectroscopy (IR) and near infrared spectroscopy (NIR). Preference is given to IR checking for any free NCO groups present (for aliphatic NCO groups, band at approximately $v=2272$ cm$^{-1}$) and, in particular, for uretdione groups (e.g. band for uretdiones based on hexamethylene diisocyanate at $v=1761$ cm$^{-1}$) and to GC analyses for unreacted compounds from B) and C).

In one preferred embodiment of the invention there is parallel allophanatization and; urethanization of the compounds of component A). For that purpose A) is introduced initially, stabilizers and, where appropriate, further auxiliaries and additives from E) are added, subsequently components B)-E) are added and the reaction mixture is brought to reaction temperature.

In another preferred embodiment first of all A) is reacted with B) until the NCO groups have reacted completely. E) or parts thereof may already be present. Subsequently the reaction of the uretdione groups of A) with B) is initiated by adding D) and additionally, where appropriate, by adapting the temperature.

In one particularly preferred embodiment the isocyanate groups and the uretdione groups are reacted with an excess of hydroxyl groups of component B. The hydroxyl groups which remain following the reaction of A) with B), with catalysis of D), are subsequently reacted preferably with further isocyanate-containing compounds, in particular with those compounds described as possible constituents of component B), with urethanization.

The unsaturated allophanates obtainable by the process of the invention, in particular those based on the products—employed preferably—of the catalytic dimerization of HDI, preferably have viscosities at 23° C. of ≦100 000 mPas, more preferably ≦060 000 mPas, very preferably ≦40 000 mPas.

The unsaturated allophanates obtainable by the process of the invention, especially those based on the products—employed preferably—of the catalytic dimerization of HDI, preferably have number-average molecular weights $M_n$ of from 600 to 3000 g/mol, more preferably from 750 to 1500 g/mol.

The unsaturated allophanates obtainable by the process of the invention preferably contain less than 0.5% by weight of free di- and/or triisocyanate monomers, more preferably less than 0.1% by weight.

The binders of the invention can be used for producing coatings and paints and also adhesives, printing inks, casting resins, dental compounds, sizes, photoresists, stereolithography systems, resins for composite materials and sealants. In the case of adhesive bonding or sealing, however, a requirement is that, in the case of UV radiation curing, at least one of the two substrates to be bonded or sealed to one another is permeable to UV radiation; in other words, in general, it must be transparent. In the case of electron beams, sufficient permeability for electrons should be ensured. Preference is given to use in paints and coatings.

The invention further provides coating compositions comprising
one or more binders obtainable in accordance with the invention,
optionally one or more polyisocyanates containing free or blocked isocyanate groups, which are free from groups which react, with polymerization, with ethylenically unsaturated compounds on exposure to actinic radiation,
optionally other compounds, different from those of a), which contain groups which react, with polymerization, with ethylenically unsaturated compounds on exposure to actinic radiation, and optionally contain free or blocked NCO groups,
optionally one or more isocyanate-reactive compounds containing active hydrogen,
initiators,
optionally solvents and
optionally auxiliaries and additives.

The polyisocyanates of component b) are known per se to the skilled person. Preference is given here to using compounds optionally modified with isocyanurate, allophanate, biuret, uretdione and/or iminooxadiazinetrione groups and based on hexamethylene diisocyanate, isophorone diisocyanate, 4,4'-diisocyanatodicyclohexylmethane and/or trimethylhexamethylene diisocyanate.

The NCO groups in this case may also be blocked, blocking agents employed being the compounds already mentioned in connection with the description of component A).

The compounds of component c) include compounds such as, in particular, urethane acrylates based preferably on hexamethylene diisocyanate, isophorone diisocyanate, 4,4'-diisocyanatodicyclohexylmethane and/or trimethylhexamethylene diisocyanate, which optionally may have been modified with isocyanurate, allophanate, biuret, uretdione and/or iminooxadiazinetrione groups, and which contain no isocyanate-group-reactive functions containing active hydrogen.

NCO-containing urethane acrylates are available commercially from Bayer AG, Leverkusen, DE as Roskydal® UA VP LS 2337, Roskydal® UA VP LS 2396 or Roskydal® UA XP 2510.

Additionally the reactive diluents already described and known in the art of radiation-curing coatings may be used as a constituent of c), provided that they do not contain any NCO-reactive groups.

Compounds of component d) can be saturated or unsaturated. Chemical functionalities reacting with NCO groups are functionalities containing activated hydrogen atoms, such as hydroxyl, amine or thiol.

Preference is given to saturated polyhydroxy compounds, examples being the polyetherpolyols, polyesterpolyols, polycarbonatepolyols, poly(meth)acrylatepolyols and/or polyurethanepolyols which are known from the technology of coating, adhesive bonding, printing inks or sealants and which contain no groups which react, with polymerization, with ethylenically unsaturated compounds on exposure to actinic radiation.

Unsaturated hydroxy-functional compounds are, for example, the epoxy acrylates, polyester acrylates, polyether acrylates, urethane acrylates and acrylated polyacrylates which are known in the art of radiation-curing coatings and have an OH number of from 30 to 300 mg KOH/g.

It is additionally possible to use the reactive diluents, already described and known in the art of radiation-curing coatings, as a constituent of d), provided that they contain NCO-reactive groups.

As initiators of component e) for a free-radical polymerization it is possible to employ initiators which can be activated thermally and/or by radiation. Photoinitiators, which are activated by UV or visible light, are preferred in this context. Photoinitiators are compounds known per se, being sold commercially, a distinction being made between unimolecular (type I) and bimolecular (type II) initiators. Suitable (type I) systems are aromatic ketone compounds, e.g. benzophenones in combination with tertiary amines, alkylbenzophenones, 4,4'-bis(dimethylamino)benzophenone (Michler's ketone), anthrone and halogenated benzophenones or mixtures of the types stated. Of further suitability are (type II) initiators such as benzoin and its derivatives, benzil ketals, acylphosphine oxides, 2,4,6-trimethylbenzoyldiphenylphosphine oxide for example, bisacylphosphine oxides, phenylglyoxylic esters, camphorquinone, α-aminoalkylphenones, α,α-dialkoxyacetophenones and α-hydroxyalkylphenones.

The initiators, which are used in amounts between 0.1% and 10% by weight, preferably 0.1% to 5% by weight, based on the weight of the film-forming binder, can be used as an individual substance or, on account of frequent advantageous synergistic effects, in combination with one another.

Where electron beams are used instead of UV irradiation there is no need for a photoinitiator. Electron beams, as is known to the skilled person, are generated by means of thermal emission and accelerated by way of a potential difference. The high-energy electrons then pass through a titanium foil and are guided onto the binders to be cured. The general principles of electron beam curing are described in detail in "Chemistry & Technology of UV & EB Formulations for Coatings, Inks & Paints", Vol. 1, P.K.T Oldring (Ed.), SITA Technology, London, England, pp. 101-157, 1991.

In the event of thermal curing of the activated double bonds, this can also take place with addition of thermally decomposing free-radical initiators. Suitability is possessed, as is known to the skilled person, by, for example, peroxy compounds such as dialkoxy dicarbonates such as, for example, bis(4-tert-butylcyclohexyl) peroxydicarbonate, dialkyl peroxides such as, for example, dilauryl peroxide, peresters of aromatic or aliphatic acids such as, for example, tert-butyl perbenzoate or tert-amyl peroxy 2-ethylhexanoate, inorganic peroxides such as, for example, ammonium peroxodisulphate, potassium peroxodisulphate, organic peroxides such as, for example, 2,2-bis(tert-butylperoxy)butane, dicumyl peroxide, tert-butyl hydroperoxide or else azo compounds such as 2,2'-azobis[N-(2-propenyl)-2-methylpropionamides], 1-[(cyano-1-methylethyl)azo]formamides, 2,2'-azobis(N-butyl-2-methylpropionamides), 2,2'-azobis-(N-cyclohexyl-2-methylpropionamides), 2,2'-azobis{2-methyl- N-[2-(1-hydroxy-butyl)]-propionamides}, 2,2'-azobis{2-methyl-N-[2-(1-hydroxybutyl)]propionamides, 2,2'-azobis{2-methyl-N-[1,1-bis(hydroxymethyl)-2-hydroxyethyl]propionamides. Also possible are highly substituted 1,2-diphenylethanes(benzpinacols), such as, for example, 3,4-dimethyl-3,4-diphenylhexane, 1,1,2,2-tetraphenylethane-1,2-diol or else the silylated derivatives thereof.

It is also possible to use a combination of initiators activable by UV light and thermally. The auxiliaries and additives of component e) include solvents of the type specified above under E).

Additionally it is possible for e), in order to increase the weather stability of the cured coating film, to comprise UV absorbers and/or HALS stabilizers as well. Preference is given to the combination. The former ought to have an absorption range of not more than 390 nm, such as triphenyltriazine types (e.g. Tinuvin® 400 (Ciba Spezialitätenchemie GmbH, Lampertheim, Del.)), benzotriazoles such as Tinuvin® 622 (Ciba Spezialitätenchemie GmbH, Lampertheim, Del.) or oxalic dianilides (e.g. Sanduvor® 3206 (Clariant, Muttenz, CH))) and are added at 0.5%-3.5% by weight, based on resin solids. Suitable HALS stabilizers are available commercially (Tinuvin® 292 or Tinuvin® 123 (Ciba Spezialitätenchemie GmbH, Lampertheim, Del.) or Sanduvor® 3258 (Clariant, Muttenz, CH). Preferred amounts are 0.5%-2.5% by weight, based on resin solids.

It is likewise possible for e) to comprise pigments, dyes, fillers, levelling additives and devolatilizing additives.

Additionally it is possible, if necessary, for the catalysts known from polyurethane chemistry for accelerating the NCO/OH reaction to be present in e). These are, for example, tin salts or zinc salts or organotin compounds, tin soaps and/or zinc soaps such as, for example, tin octoate, dibutyltin dilaurate, dibutyltin oxide or tertiary amines such as diazabicyclo[2.2.2]octane (DABCO).

The application of the coating compositions of the invention to the material to be coated takes place with the methods known and customary in coatings technology, such as spraying, knife coating, rolling, pouring, dipping, spin coating, brushing or squirting or by means of printing techniques such as screen, gravure, flexographic or offset printing and also by means of transfer methods.

Suitable substrates are, for example, wood, metal, including in particular metal as used in the applications of wire enameling, coil coating, can coating or container coating, and also plastic, including plastic in the form of films, especially ABS, AMMA, ASA, CA, CAB, EP, UF, CF, MF, MPF, PF, PAN, PA, PE, HDPE, LDPE, LLDPE, UHMWPE, PET, PMMA, PP, PS, SB, PUR, PVC, RF, SAN, PBT, PPE, POM, PUR-RIM, SMC, BMC, PP-EPDM, and UP (abbreviations according to DIN 7728T1), paper, leather, textiles, felt, glass, wood, wood materials, cork, inorganically bonded substrates such as wooden boards and fibre cement slabs, electronic assemblies or mineral substrates. It is also possible to coat substrates consisting of a variety of the abovementioned materials, or to coat already coated substrates such as vehicles, aircraft or boats and also parts thereof, especially vehicle bodies or parts for exterior mounting. It is also possible to apply the coating compositions to a substrate temporarily, then to cure them partly or fully and optionally to detach them again, in order to produce films, for example.

For curing it is possible for solvents present, for example, to be removed entirely or partly by flashing off.

Subsequently or simultaneously it is possible for the optionally necessary thermal and the photochemical curing operation or operations to be carried out in succession or simultaneously. If necessary the thermal curing can take place at room temperature or else at elevated temperature, preferably at 40-106° C., preferably at 60-130° C., more preferably at 80-110° C.

Where photoinitiators are used in e) the radiation cure takes place preferably by exposure to high-energy radiation, in other words UV radiation or daylight, such as light of wavelength 200 to 700 nm or by bombardment with high-energy electrons (electron beams, 150 to 300 keV). Radiation sources of light or UV light used are, for example, high-pressure or medium-pressure mercury vapour lamps, it being possible for the mercury vapour to have been modified by doping with other elements such as gallium or iron. Lasers, pulsed lamps (known under the designation of UV flashlight lamps), halogen lamps or excimer emitters are likewise possible. As an inherent part of their design or through the use of special filters and/or reflectors, the emitters may be equipped so that part of the UV spectrum is prevented from being emitted. By way of example, for reasons of occupational hygiene, for example, the radiation assigned to UV-C or to UV-C and UV-B may be filtered out. The emitters may be installed in stationary fashion, so that the material for irradiation is conveyed past the radiation source by means of a mechanical device, or the emitters may be mobile and the material for irradiation may remain stationary in the course of curing. The radiation dose which is normally sufficient for crosslinking in the case of UV curing is situated in the range from 80 to 5000 mJ/cm$^2$.

Irradiation can if desired also be carried out in the absence of oxygen, such as under an inert gas atmosphere or an oxygen-reduced atmosphere. Suitable inert gases are preferably nitrogen, carbon dioxide, noble gases or combustion gases. Irradiation may additionally take place by covering the coating with media transparent to the radiation. Examples of such are, for example, polymeric films, glass or liquids such as water.

Depending on the radiation dose and curing conditions it is possible to vary the type and concentration of any initiator used, in a manner known to the skilled person.

Particular preference is given to carrying out curing using high-pressure mercury lamps in stationary installations. Photoinitiators are then employed at concentrations of from 0.1% to 10% by weight, more preferably from 0.2% to 3.0% by weight, based on the solids of the coating. For curing these coatings it is preferred to use a dose of from 200 to 3000 mJ/cm$^2$, measured in the wavelength range from 200 to 600 nm.

In the case of use of thermally activable initiators in d) by increasing the temperature. The thermal energy may be introduced into the coating by means of radiation, thermal conduction and/or convection, it being customary to employ the ovens, near-infrared lamps and/or infrared lamps that are conventional in coatings technology.

The applied film thicknesses (prior to curing) are typically between 0.5 and 5000 μm, preferably between 5 and 1000 μm, more preferably between 15 and 200 μm. Where solvents are used, it is removed after application and before curing, by the customary methods.

EXAMPLES

All percentages are by weight unless indicated otherwise.
The determination of the NCO contents in % was undertaken by back-titration with 0.1 mol/l hydrochloric acid following reaction with butylamine, on the basis of DIN EN ISO 11909.

The viscosity measurements were carried out with a cone-plate viscosimeter (SM-KP), Viskolab LC3/ISO from Paar Physica, Ostfildern, DE in accordance with ISO/DIS 3219: 1990.

Infrared spectroscopy was on liquid films applied between sodium chloride plates on a model 157 instrument from Perkin Elmer, Überlingen, DE.

The amounts of trimer, uretdione, allophanate and urethane structures in the end product were determined by means of NMR spectroscopy. For this purpose, $^{13}$C-NMR spectra of a sample were recorded in CDCl$_3$ (DPX 400 and AVC 400 from Bruker, Karlsruhe, DE, resonance frequency 100 MHz, relaxation delay 4 s, 2000 scans, acquisition time 1.03 seconds and angle of excitation 30° C.) and the molar proportions of the substructures were determined from the signal integrations at $\delta(^{13}C)$=121.4 ppm (1C; NCO), 148.4 ppm (3C, trimer), 153.8 ppm (1C; allophanate), 156.3 ppm (1C, urethane) and 157.1 ppm (2C; uretdione).

The amount of residue monomers and amount of volatile synthesis components were analyzed by means of GC (method using tetradecane as internal standard, oven temperature 110° C., injector temperature 150° C., carrier gas helium, instrument: 6890 N, Agilent, Waldbronn, DE, column-Restek RT 50, 30 m, 32 mm internal diameter, film thickness 0.25 μm).

The solids was determined in accordance with DIN 53216/1 draft 4/89, ISO 3251

The ambient temperature of 23° C. prevailing at the time when the experiments were conducted is referred to as RT.

Desmodur® N 3400: HDI polyisocyanate predominantly containing uretdione structure, viscosity 185 mPas/23° C., NCO content 21.4%, commercial product of Bayer AG, Leverkusen, DE Desmorapid® Z: dibutyltin dilaurate (DBTL), commercial product of Bayer AG, Leverkusen, DE Darocur® 1173 photoinitiator, commercial product of Ciba Spezialitätenchemie GmbH, Lampertheim, DE Tone® M100: reaction product of 2 equivalents of ε-caprolactone with 1 equivalent of 2-hydroxyethyl acrylate, OH content=4.97%, viscosity=82 mPas/23° C., commercial product of Dow, Schwalbach, DE.

Examples 1-3 describe the preparation of suitable catalytically active phenoxides, which in Examples 4-5 are used for the reaction of compounds containing uretdione groups with ethylenically unsaturated hydroxyl compounds to form corresponding compounds containing allophanates.

Example 1

Tetrabutylammonium 4-(Methoxycarbonyl)Phenoxide

A glass flask with reflux condenser, heatable oil bath, mechanical stirrer and internal thermometer was charged at room temperature with 38.00 g of methyl 4-hydroxybenzoate and 277.92 g of water and these components were stirred together thoroughly. Subsequently 162.00 g of tetrabutylammonium hydroxide (40% strength in water) were added and the reaction mixture was heated to 60° C. It was stirred at 60° C. for one hour (the contents of the flask become clear). Then the reaction mixture was cooled and the water was distilled off under reduced pressure, 20 mbar, at 30-45° C. The product was then washed with butyl acetate and dried at 80° C. and 10 mbar in a vacuum drying cabinet. This gave a white solid.

Example 2

Tetrabutylammonium 4-Formylphenoxide

A glass flask with reflux condenser, heatable oil bath, mechanical stirrer and internal thermometer was charged at room temperature with 7.64 g of 4-hydroxybenzaldehyde and 93.86 g of water and these components were stirred together thoroughly. Subsequently 40.54 g of tetrabutylammonium hydroxide (40% strength in MeOH) were added and the reaction mixture was heated to 60° C. It was stirred at 60° C. for one hour (the contents of the flask became clear). Then the reaction mixture was cooled and the solvents (methanol and water) were distilled off under reduced pressure, 20 mbar, at 30-45° C. The product was then washed with butyl acetate and dried at 80° C. and 10 mbar in a vacuum drying cabinet. This gave a white-beige solid.

Example 3

Tetrabutylammonium Salicylate

A glass flask with reflux condenser, heatable oil bath, mechanical stirrer and internal thermometer was charged at room temperature with 35.90 g of ethyl salicylate and 282.13 g of water and these components were stirred together thoroughly. Subsequently 139.98 g of tetrabutylammonium hydroxide (40% strength in water) were added and the reaction mixture was heated to 60° C. It was stirred at 60° C. for one hour (the contents of the flask became clear). Then the reaction mixture was cooled and the water was distilled off under reduced pressure, 20 mbar, at 30-45° C. The residue was taken up at 60° C. in 200 ml of toluene. Subsequently the mixture was redistilled. The residue was recrystallized from 50 ml of butyl acetate. The product was filtered off, washed with butyl acetate and dried at 80° C. and 10 mbar in a vacuum drying cabinet. This gave a white solid.

Example 4

Inventive Allophanate-Containing Binder

A three-necked flask with reflux condenser, stirrer and dropping funnel, and through which air was passed (6 l/h), was charged at RT with 42.70 g of Desmodur® N3400, 0.15 g of 2,6-di-tert-butyl-4-methylphenol and 0.001 g of Desmorapid® Z and this initial charge was then heated to 60° C. 75.72 g of Tone® M100 were slowly added dropwise, in the course of which a maximum temperature of 70° C. was attained. Thereafter the reaction mixture was held at 70° C. until the NCO content<0.2%. Subsequently the reaction mixture was heated to 80° C. and a mixture of 31.05 g of Tone® M100 and 0.37 g of the catalyst prepared according to Example 1 was added dropwise. The reaction mixture was held at 80° C. until in the IR spectrum at ν=1768 cm$^{-1}$ uretdione groups were no longer detectable. The product obtained was clear and had a viscosity of 9300 mPas/23° C., an NCO content of 0%, a trimer content of 6.5 mol %, an allophanate content of 32.0 mol %, a urethane content of 61.5 mol % and a uretdione content of 0 mol %.

Example 5

Inventive Allophanate-Containing Binder

A three-necked flask with reflux condenser, stirrer and dropping funnel, and through which air was passed (6 l/h), was charged at RT with 53.48 g of Desmodur® N3400, 0.08 g of 2,6-di-tert-butyl-4-methylphenol and 0.001 g of Desmorapid® Z and this initial charge was then heated to 60° C. 31.83 g of 2-hydroxyethyl acrylate were slowly added dropwise, in the course of which a maximum temperature of 70° C. was attained. Thereafter the reaction mixture was held at 70° C. until the NCO content<0.1%. Subsequently a mixture of 15.66 g of 2-hydroxyethyl acrylate and 0.51 g of the catalyst from Example 3 was added dropwise. The reaction mixture was heated to and held at 80° C. until in the IR spectrum at ν=1768 cm$^{-1}$ after 3.5 h only a very weak signal for uretdione groups was detectable. 0.10 g of benzoyl chloride was added and the mixture was cooled rapidly to RT. A sample taken was found by gas chromatography to have a hydroxyethyl acrylate content of 4.15%. 6.8 g of hydroxyethyl acrylate were added and the mixture was stirred at 80° C. until in the IR spectrum at ν=2272 cm$^{-1}$ there was no longer signal for the isocyanate group. The hydroxyethyl acrylate content of a sample taken was found by gas chromatography to be 0.07%. The product obtained was clear and had a viscosity of 56 500 mPas/23° C. and an NCO content of 0%.

Comparative Example C1

Attempt to Prepare an Allophanate-Containing Binder

The catalysts described in US-A 2003 301 537 13 for the crosslinking of powder coating materials comprising uretdione-group-containing curing gents and polymeric hydroxyl compounds without activated double bonds were examined for suitability:
Example 5 was repeated with the difference that, instead of the catalyst from Example 3, now 0.51 g of tetrabutylammonium hydroxide was used as catalyst. The reaction mixture was heated to and held at 80° C. until in the IR spectrum at ν=1768 cm$^{-1}$ after 2 h only a very weak signal for uretdione groups was detectable. 0.10 g of benzoyl chloride was added and the mixture was cooled rapidly to RT. In the course of this cooling the reaction mixture turned cloudy. The hydroxyethyl acrylate content of a sample taken was found by gas chromatography to be 2.4%. 5.20 g of Desmodur® N3400 were added to the reaction mixture, which was stirred at 70° C. until in the IR spectrum at ν=2272 cm$^{-1}$ there was no longer any signal for the isocyanate group. The hydroxyethyl acrylate content of a sample taken was found by gas chromatography to be 0.17%. A cloudy product was obtained with a viscosity of 84 000 mPas/23° C. and an NCO content of 0%.

Comparative Example C2

Attempt to Prepare an Allophanate-Containing Binder

The catalysts described in US-A 2003 301 537 13 for the crosslinking of powder coating materials comprising uretdione-group-containing curing gents and polymeric hydroxyl compounds without activated double bonds were examined for suitability:
Example 5 was repeated with the difference that, instead of the catalyst from Example 3, now 0.67 g of tetrabutylammonium fluoride was used as catalyst. The reaction mixture was heated to and held at 80° C. until in the IR spectrum at ν=1768 cm$^{-1}$ after 3 h only a very weak signal for uretdione groups was detectable. 0.10 g of benzoyl chloride was added and the mixture was cooled rapidly to RT. In the course of this cooling the reaction mixture turned cloudy, and a colourless precipitate formed. The hydroxyethyl acrylate content of a sample taken was found by gas chromatography to be 1.7%. 4.30 g of Desmodur® N3400 were added to the reaction mixture, which was stirred at 70° C. until in the IR spectrum at ν=2272 cm$^{-1}$ there was no longer any signal for the isocyanate group. The hydroxyethyl acrylate content of a sample taken was found by gas chromatography to be 0.15%. A cloudy product was obtained with a viscosity of 92 000 mPas/23° C. and an NCO content of 0%.

Comparative Examples 6 and 7 show that the substances which are suitable for crosslinking powder coating materials composed of uretdione-group-containing curing agents and polymeric hydroxyl compounds are not suitable for the targeted synthesis of allophanates from uretdiones and alcohols. The products thus obtained are clouded and of relatively high viscosity, so making them unsuitable for producing coatings.

Example 6

Coating Formulation and Coating Material

A portion of the product from Example 5 was mixed thoroughly with 3.0% of the photoinitiator Darocur® 1173. Using a bone doctor blade with a gap of 90 μm the mixture was drawn down in the form of a thin film onto a glass plate. UV irradiation (medium pressure mercury lamp, IST Metz GmbH, Nürtingen, DE, 750 mJ/cm$^2$) gave a hard, transparent coating which could not be damaged by scratching using steel wool (grade 0/0/0) in ten back-and-forth strokes with a force of 500 g directed onto the film.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:
1. Binders containing allophanate groups and containing groups capable of participating in a polymerization reaction with ethylenically unsaturated compounds on exposure to actinic radiation, obtained by a process comprising:
   1) reacting via urethanization:
      A) the NCO groups of one or more compounds containing uretdione groups and NCO groups with
      B) the OH groups of one or more OH-functional compounds containing ethylenically unsaturated groups polymerizable on exposure to actinic radiation, and
   2) reacting via allophanatization:
      the reaction product of step 1) with
      one or more compounds B) and
      C) optionally further NCO-reactive compounds,
      the reaction via allophanatization occurring in the presence of D) one or more compounds containing phenoxide groups, as catalysts.
2. Binders containing allophanate groups according to claim 1, wherein the binders have a viscosity at 23° C. of ≧100 000 mPas.
3. A method of preparing coatings, coating materials, adhesives, printing inks, casting resins, dental compounds, sizes, photoresists, stereolithography systems, resins for composite materials and sealants comprising combining the binders containing allophanate groups according to claim 1 and one or more additives selected from the group consisting of UV absorbers, HALS stabilizers, pigments, dyes, fillers, levelling additives, devolatilizing additives, catalysts, and combinations thereof.

4. Coating compositions comprising
a) one or more binders containing allophanate groups, according to claim 1,
b) optionally one or more polyisocyanates containing free or blocked isocyanate groups, which are free from groups capable of participating in a polymerization reaction with ethylenically unsaturated compounds on exposure to actinic radiation,
c) optionally other compounds, different from those of a), which contain groups capable of participating in a polymerization reaction with ethylenically unsaturated compounds on exposure to actinic radiation, and optionally contain free or blocked NCO groups,
d) optionally one or more isocyanate-reactive compounds containing active hydrogen,
e) initiators,
f) optionally solvents and
g) optionally auxiliaries and additives.

5. Substrates coated with coatings obtained from binders containing allophanate groups, according to claim 1.

6. Coating compositions comprising
a) one or more binders containing allophanate groups, according to claim 2,
b) optionally one or more polyisocyanates containing free or blocked isocyanate groups, which are free from groups capable of participating in a polymerization reaction with ethylenically unsaturated compounds on exposure to actinic radiation,
c) optionally other compounds, different from those of a), which contain groups capable of participating in a polymerization reaction with ethylenically unsaturated compounds on exposure to actinic radiation, and optionally contain free or blocked NCO groups,
d) optionally one or more isocyanate-reactive compounds containing active hydrogen,
e) initiators,
f) optionally solvents and
g) optionally auxiliaries and additives.

7. Substrates coated with coatings obtained from binders containing allophanate groups, according to claim 2.

8. Binders containing allophanate groups and containing groups capable of participating in a polymerization reaction with ethylenically unsaturated compounds on exposure to actinic radiation, obtained by a process comprising:

1) reacting via urethanization:
   A) the NCO groups of one or more compounds containing uretdione groups and NCO groups, said compounds being based on hexamethylene diisocyanate, with
   B) the OH groups of one or more OH-functional compounds containing ethylenically unsaturated groups polymerizable on exposure to actinic radiation, and
2) reacting via allophanatization:
   the reaction product of step 1) with
   one or more compounds B) and
   C) optionally further NCO-reactive compounds,
   the reaction via allophanatization occurring in the presence of D) one or more compounds containing phenoxide groups, as catalysts.

9. Binders containing allophanate groups according to claim 8, wherein the binders have a viscosity at 23° C. of $\geq$100 000 mPas.

10. A method of preparing coatings, coating materials, adhesives, printing inks, casting resins, dental compounds, sizes, photoresists, stereolithography systems, resins for composite materials and sealants comprising combining the binders containing allophanate groups according to claim 9 and one or more additives selected from the group consisting of UV absorbers, HALS stabilizers, pigments, dyes, fillers, levelling additives, devolatilizing additives, catalysts, and combinations thereof.

11. Coating compositions comprising
a) one or more binders containing allophanate groups, according to claim 9,
b) optionally one or more polyisocyanates containing free or blocked isocyanate groups, which are free from groups capable of participating in a polymerization reaction with ethylenically unsaturated compounds on exposure to actinic radiation,
c) optionally other compounds, different from those of a), which contain groups capable of participating in a polymerization reaction with ethylenically unsaturated compounds on exposure to actinic radiation, and optionally contain free or blocked NCO groups,
d) optionally one or more isocyanate-reactive compounds containing active hydrogen,
e) initiators,
f) optionally solvents and
g) optionally auxiliaries and additives.

12. Substrates coated with coatings obtained from binders containing allophanate groups, according to claim 9.

* * * * *